(12) United States Patent
Bacus et al.

(10) Patent No.: US 8,769,050 B2
(45) Date of Patent: Jul. 1, 2014

(54) SERVING FONT FILES IN VARYING FORMATS BASED ON USER AGENT TYPE

(75) Inventors: Mike Bacus, Tigard, OR (US); Bruce Quincy Hammond, Beaverton, OR (US)

(73) Assignee: Celartern, Inc., Portland, OR (US)

(*) Notice: Subject to any disclaimer, the term of this patent is extended or adjusted under 35 U.S.C. 154(b) by 706 days.

(21) Appl. No.: 12/580,718

(22) Filed: Oct. 16, 2009

(65) Prior Publication Data

US 2011/0093565 A1     Apr. 21, 2011

(51) Int. Cl.
    G06F 15/16     (2006.01)

(52) U.S. Cl.
    USPC .......................................... 709/219; 709/228

(58) Field of Classification Search
    USPC .......................................... 709/219, 228, 246
    See application file for complete search history.

(56) References Cited

U.S. PATENT DOCUMENTS

| | | | |
|---|---|---|---|
| 5,444,829 A | 8/1995 | Kawabata et al. | |
| 5,528,742 A | 6/1996 | Moore et al. | |
| 5,533,174 A * | 7/1996 | Flowers et al. | 358/1.15 |
| 5,586,242 A | 12/1996 | McQueen et al. | |
| 5,600,770 A | 2/1997 | Kawabata et al. | |
| 5,671,412 A | 9/1997 | Christiano | |
| 5,675,718 A | 10/1997 | Miller | |
| 5,781,714 A * | 7/1998 | Collins et al. | 345/471 |
| 5,893,915 A * | 4/1999 | Cordell et al. | 715/262 |
| 5,940,581 A | 8/1999 | Lipton | |
| 5,963,641 A | 10/1999 | Crandall et al. | |
| 6,012,071 A | 1/2000 | Krishna et al. | |
| 6,065,008 A | 5/2000 | Simon et al. | |
| 6,073,148 A | 6/2000 | Rowe et al. | |
| 6,252,671 B1 | 6/2001 | Peng et al. | |
| 6,323,865 B1 | 11/2001 | Colletti | |
| 6,421,055 B1 | 7/2002 | Jones et al. | |
| 6,512,531 B1 | 1/2003 | Gartland | |
| 6,687,879 B1 | 2/2004 | Teshima | |
| 6,751,726 B1 | 6/2004 | Dresevic et al. | |
| 6,826,728 B1 | 11/2004 | Horiyama | |
| 6,853,980 B1 * | 2/2005 | Ying et al. | 705/26.62 |
| 6,882,344 B1 | 4/2005 | Hayes et al. | |
| 6,889,202 B2 * | 5/2005 | Johnson et al. | 705/26.5 |
| 6,901,427 B2 | 5/2005 | Teshima | |
| 7,010,587 B1 | 3/2006 | Shiimori | |
| 7,143,347 B2 * | 11/2006 | Su | 715/208 |
| 7,539,939 B1 | 5/2009 | Schomer | |

(Continued)

OTHER PUBLICATIONS

Kew et al., "WOFF File Format", Sep. 16, 2009, http://people.mozilla.org/~jkew/woff/woff-2009-09-16.html.*

(Continued)

*Primary Examiner* — Douglas Blair
(74) *Attorney, Agent, or Firm* — Banner & Witcoff, Ltd.

(57) ABSTRACT

To resolve compatibility issues between font file formats and user agents such as web browsers, a font repository may determine a compatible font file format upon receiving a request from the user agent for a font. The determination may be made based on the type of user agent making the request. In one or more arrangements, if a font file in the compatible font file format is not available at the repository, a request may be transmitted to another repository. A font reference in a style sheet or code defining the network document may be unique to the font, but common to all font files corresponding to the font. An application for facilitating the generation of a network document may thus automatically generate such a code in response to a user selecting a desired font.

25 Claims, 10 Drawing Sheets

(56) References Cited

U.S. PATENT DOCUMENTS

| | | | |
|---|---|---|---|
| 7,570,374 B2* | 8/2009 | Kawara | 358/1.11 |
| 7,746,358 B2* | 6/2010 | Eilers | 345/629 |
| 8,462,360 B2* | 6/2013 | Miyazawa et al. | 358/1.11 |
| 8,555,162 B2* | 10/2013 | Bacus et al. | 715/269 |
| 2001/0052901 A1 | 12/2001 | Kawabata et al. | |
| 2002/0010725 A1* | 1/2002 | Mo | 707/530 |
| 2002/0136578 A1* | 9/2002 | Johnson et al. | 400/70 |
| 2003/0131321 A1 | 7/2003 | Teshima | |
| 2004/0017585 A1* | 1/2004 | Makishima et al. | 358/1.18 |
| 2004/0145760 A1 | 7/2004 | Kurumida | |
| 2004/0177056 A1 | 9/2004 | Davis et al. | |
| 2005/0270553 A1* | 12/2005 | Kawara | 358/1.13 |
| 2006/0182418 A1* | 8/2006 | Yamagata et al. | 386/95 |
| 2006/0253395 A1* | 11/2006 | Corbell | 705/50 |
| 2007/0177206 A1* | 8/2007 | Miyazawa et al. | 358/1.15 |
| 2007/0291297 A1* | 12/2007 | Harmon et al. | 358/1.15 |
| 2010/0218086 A1* | 8/2010 | Howell et al. | 715/236 |
| 2011/0090230 A1* | 4/2011 | Bacus et al. | 345/467 |

OTHER PUBLICATIONS

"FontSync Introduction" by Apple Computer, Inc., published Dec. 4, 2000 (showing revisions back to Oct. 15, 1999).

"Castle System End User License Agreement" found at http://home.earthlink.net/~castlesys/font_license.html., copyright 1996.

Partial European Search Report for patent application No. 10186022.9 mailed Sep. 6, 2013.

Weston Router: "Efficiently Serving Custon Web Fonts", Dec. 30, 2008, Portland, OR.

"CSS Fonts Module Level 3, W3C Working Draft Jun. 18, 2009", Jun. 19, 2009, 19 pages, XP055077195.

Official Notification of Reason for Rejection for Japanese Patent Application No. 2010-229745 mailed Apr. 8, 2014.

Extended European Search Report for application No. 10186022.9 mailed Jan. 17, 2014.

\* cited by examiner

```
<html>
<head>
<title>Web Font Sample</title>
<style type="text/css" media="screen, print">
201 ⎯ @font-face {
       font-family: "Bitstream Vera Serif Bold"; ⎯ 205
       src: url("http://developer.mozilla.org/@api/deki/files/2934/=VeraseBd.ttf");
     }                                                                    ⎯ 210
     body { font-family: "Bitstream Vera Serif Bold", serif }
</style>                                         ⎯ 215
</head>
<body>
    This is Bitstream Vera Serif Bold.
</body>
</html>
```

SERVING FONT FILES IN VARYING FORMATS BASED ON USER AGENT TYPE

FIELD OF ART

Aspects of the present disclosure relate to the display of text in network browsers in various fonts.

BACKGROUND

Differing web standards have been an issue that web developers, browser vendors and end users have had to address in developing, supporting and accessing on-line content. For example, different web browsers may offer different compatibility with various fonts, font file formats, document types, document formats and the like. A consequence of these differing standards and compatibility issues is that document authors may be forced to use generic or standard fonts to insure that all potential web site visitors are able to view the document properly. Accordingly, document authors are sometimes unable to use stylized text and other non-standard fonts that would provide a greater allowance for creativity and uniqueness.

Style sheets provide a mechanism through which a document author may identify the location of a particular font so that an end user may download a corresponding font file to view the font. However, the format of the font file might not be compatible with an end user's browser or application with which he or she is accessing the web page or other network document. Thus, using the font specification mechanisms of style sheets, some users might still not be able to view a web page as intended by the document author (e.g., using a specific styles font).

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

Aspects of the disclosure relate to a font server that processes font requests by determining a user agent type (e.g., a browser type). Using the determined user agent type, the network server may retrieve and return the requested font in a font file format compatible with the determined user agent type. Thus, the page or document developer does not need to decide on a single font file format to reference for a particular font. Instead, the decision may be left to the font server so that all browser types may be supported.

According to another aspect, a font file may be referenced in a network document or a style sheet associated therewith using an identifier that is unique to a font or font family, but universal to all font file formats for that particular font or font family.

According to yet another aspect, a document creation application may be configured to generate a web document in addition to a corresponding style sheet for defining a layout and look of the web document. The application may further be configured to retrieve fonts or font identification information from a font server and to generate code fragments in the style sheet or web document referencing a selected font or font family.

According to yet another aspect, if a network server does not have a font file for a font or a font file in a compatible format, the network server may update its list of fonts or font files. If the font server is then able to find the font file, the server may redirect the request to a specified other font server or font location if the font file is not stored at that server. A compatible font file may then be transmitted to the requesting device from the other font server or through the original font server (i.e., acting as an intermediary).

According to still another aspect, a web developer may specify and a user agent may request a reduced glyph range for a particular font. This may be used to reduce the amount of bandwidth required to obtain the necessary information for viewing a network document published by the developer. The font server or a servlet associated therewith may evaluate the validity of the request and upon verifying that the request is valid, generate a font file for a requested font that includes only the request range of glyphs. A requested glyph range may be provided in the request. For example, the glyph range may be specified in the request string for an HTTP request.

BRIEF DESCRIPTION OF THE DRAWINGS

Various objects, features, and advantages of the present invention will be more readily apparent and more fully understood from the following detailed description, taken in connection with the appended drawings, in which:

FIG. 2 illustrates an example style sheet embedded in a web document that may be used according to one or more aspects described herein;

DETAILED DESCRIPTION

As described above, aspects of the disclosure relate to systems, apparatuses, methods, and computer-readable media for obtaining and processing fonts in an on-line web environment. A font, as used herein, may refer to a collection of characters in a typeface. In one or more examples, a font may refer to a set of all characters defined for that particular typeface. A user may upload a font file to a web server in a font file format that might only be compatible with one or more particular types of applications such as web browsers. Accordingly, the web server may generate a second font file in another font file format that is compatible with other types of applications and web browsers. Alternatively, the user may upload a font file in multiple font file formats rather than asking the web server to generate the font file in the other format. Using the web server, browsers may obtain the font file in the appropriate format. This allows users to use various styles and fonts in their webpages without having to customize pages to one type of browser or another.

Figure 1:
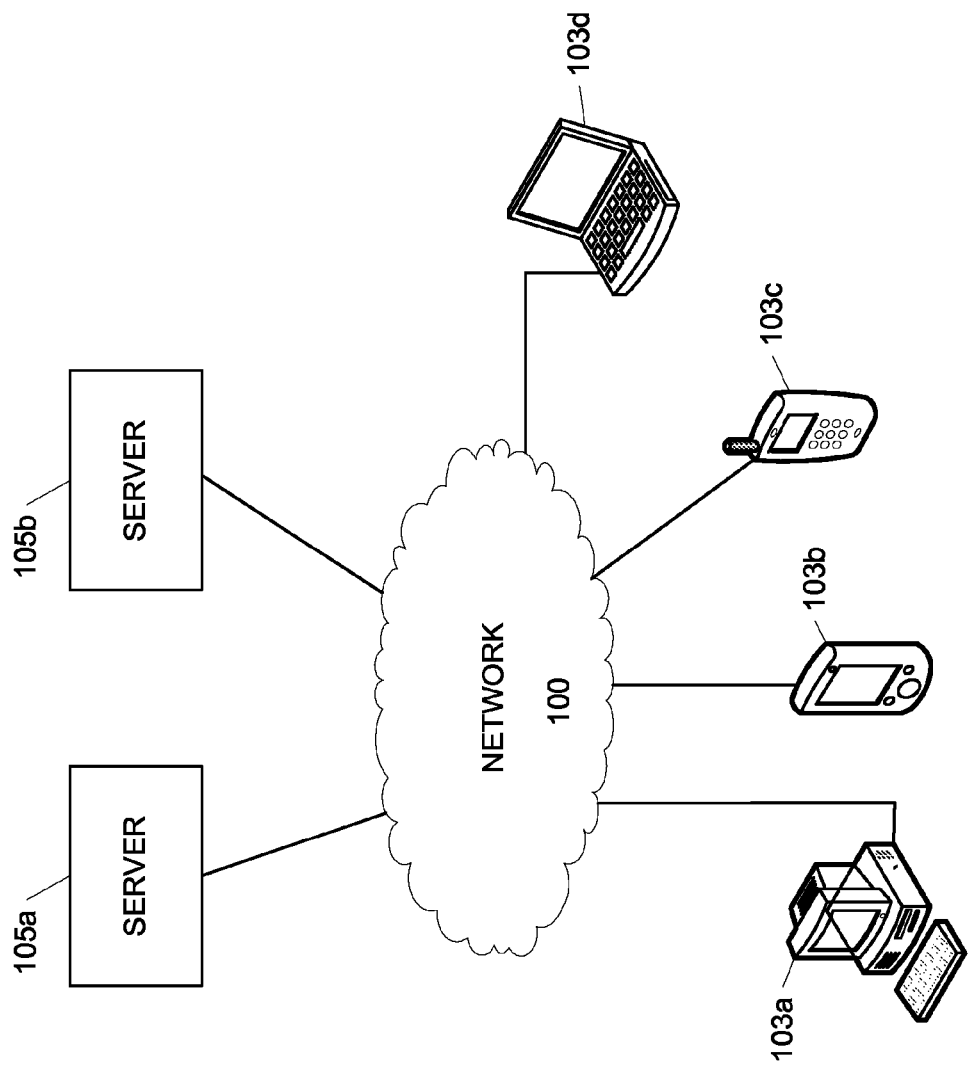
FIG. 1 illustrates an example computer system and environment in which one or more aspects of the present invention may be practiced.

FIG. 1 illustrates a network environment in which font files may be transmitted and used to generate text in network documents such as webpages. Network 100 may be configured to provide communications between a variety of devices including client devices 103 and network servers 105. The communications may conform to one or more communication protocols including Internet Protocol (IP), Hyper Text Transfer Protocol (HTTP), File Transfer Protocol (FTP) and the like. Devices 103 may include stationary devices such as personal computer (PC) 103*a* as well as mobile communication devices such as personal data assistant (PDA) 103*b*, mobile phone 103*c* and laptop computer 103*d*. Network servers 105 may be configured to store and host various types of information including web pages, music content, video content, applications and the like. In one configuration, network server 105*a* may be configured to host one or more webpages or websites for a user or organization. The webpages may be formatted according to hypertext markup language (HTML), for example. Other web formats such as extensible markup language (XML), extensible hypertext markup language (XHTML) and the like. The webpages and sites may further be defined based on a cascading style sheet (CSS) that is configured to describe the layout and presentation of a document written in a markup language such as HTML or XML. CSS is designed primarily to enable the separation of document content (written in HTML or a similar markup language) from document presentation, including elements such as the colors, fonts, and layout (e.g., margins, borders). Accordingly, when one of devices 103 requests a page from network server 105*a*, network server 105*a* may return a web document along with one or more corresponding style sheets referenced therein. Devices 103 may then render the web document according to the document coding as well as the corresponding style sheets using an application such as a web browser. In one example, a style sheet may include a font parameter (e.g., the @font-face rule) that stores or corresponds to a URI specifying the location of a font file for a font in which one or more portions of the web document are to be rendered. Font files generally refer to data files that store the information necessary for a computing device to render a set of symbols and characters in a particular font. Devices 103 may retrieve the font file so that those portions of the web document may be rendered as intended by the creator/author.

According to one or more aspects, network server 105*b* may be configured to store font files. Font files may be created according to a variety of formats and thus, different types of browsers and applications may have different compatibilities with those formats. For example, fonts may be created according to TrueType, OpenType or Embedded OpenType formats. However, some web browsers such as MICROSOFT'S INTERNET EXPLORER might not be compatible with TrueType and OpenType font file formats, while other browsers might not be compatible with the Embedded OpenType font file format. To resolve such compatibility issues, network server 105*b* may store a font file in multiple formats to provide compatibility with multiple browser and application types. Upon receiving a font file request from one or more of devices 103, network server 105*b* may determine a browser or application type and choose a compatible format of the font file to send to the requesting device. This eliminates the need for the document author to decide which font file format to use and to sacrifice a segment of her potential audience due to incompatibility issues.

FIG. 2 illustrates an example style sheet that may be used in accordance with the font retrieval described herein. Cascading style sheet 200 includes the @font-face rule 201 that defines a font or font family such as font family 205 for a user device that does not currently have font family 205 installed. Cascading style sheet 200 further defines a location 210 (e.g., a uniform resource identifier) where a font file for font family 205 may be obtained. The font family may subsequently be used to define the font 215 to be used in the body of the document defined by HTML file 220. Although cascading style sheet 200, as illustrated, only provides a single font definition, additional font or font family definitions may be added for use in a corresponding web document. For example, one font may be used for headers while another font may be used for body text. As illustrated, style sheet 200 is embedded within HTML file 220. In other arrangements, the style sheet may be external to the HTML document with the HTML file including a reference to the external style sheet (as discussed in further detail herein).

Figure 3:
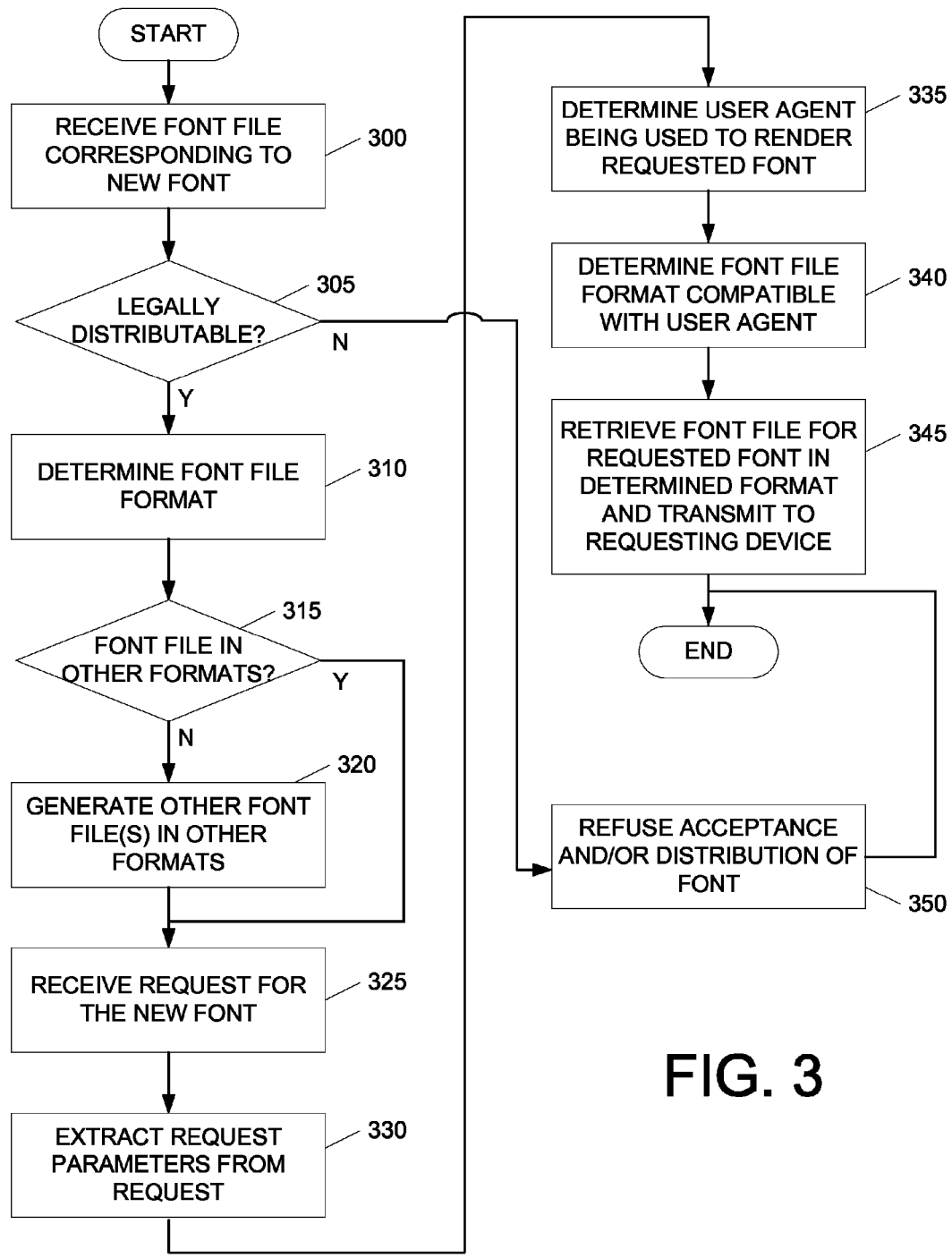
FIG. 3 is a flowchart illustrating an example method by which fonts may be obtained from a font server based on user agent compatibility.

FIG. 3 illustrates a method by which fonts may be obtained from a font server based on a compatibility of a requesting application. In step 300, the font server may receive a font file corresponding to a new font from a web document author or other source. For example, a document author may wish to use a font in a web page that is not currently provided in the font server. In such a case, the author may upload the font to the font server so that visitors to the page may see the page in its intended format and style and so that other authors may use the font as well. In step 305, the font server may verify that the font file is legally distributable. If the font or font file is not legally distributable, the font server may refuse acceptance and/or distribution of the font or font file in step 350. In one example, the verification may be performed by extracting embedded metadata set by a font foundry that created the font from the font file and determine whether the metadata indicates that the font file may be distributed. If the font server determines that the font file is legally distributable, the font server may then determine the format in which the font file was created in step 310. Example font file formats include TrueType, OpenType, Embedded OpenType and the like. The format may be identified through the file name, file extension information, metadata, coding structure and/or combinations thereof. Once the font file format has been identified, the server may determine whether font files for the font exist in other font file formats in step 315. If not, the font server may generate font files in the other font file formats based on the font data stored in the received font file in step 320. In one or more examples, a font file creation tool such as Web Embedding Fonts Tool (WEFT) by MICROSOFT may be used. Additionally or alternatively, font files may be created using the font file format standards such as those for Embedded OpenType available at http://www.w3.org/Submission/EOT/. The required formats may be defined as a default list or may be customized for each font or font family.

In step 325, the font server or a servlet thereof may receive a request for the font or font family corresponding to the received font file. In one example, the request may be structured according to an HTTP GET request that may include a user-agent request-header field that contains information about the user agent (i.e., browser or application requesting the information) originating the request. From the request, the font server or servlet may extract various parameters and other types of information in step 330 including identification information for the requested font or font family and a type of browser being used to access the page referencing the requested font or font family. For example, the font name and the browser application name may be specified in the HTTP GET headers. In step 335, the font server or servlet may determine the user agent being used to render the requested font. In step 340, the font server may then determine a compatible font file format for the user agent (e.g., a type of web browser) being used. For example, MICROSOFT INTERNET EXPLORER might only be compatible with the Embedded OpenType font file format. In one or more arrangements, browser type may also include or refer to a version of the browser. Once the compatible font file format is determined, the font server or servlet may retrieve the requested font or font family font file in the determined format and transmit it to the requesting device in step 345.

At some point after receiving the font file and prior to making the font file available for distribution, the font server may process the font file, for example, to reduce the glyph set of the font to those required by the web designer (or web document in which the font is referenced) and/or compressing the font data. In one example, the font file may be processed shortly after receiving the font file. In another example, the font file may be processed in response to receiving a request for the corresponding font. The font file may be reduce to include only those characters or symbols that are used in the web document using the font.

Figure 8:
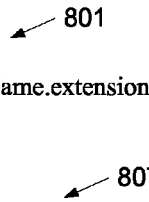
FIG. 8 illustrates an example syntax for defining a reduced glyph range request according to one or more aspects described herein.

FIG. 8 illustrates an example syntax for defining a reduced glyph range (i.e., less than all glyphs defined or available) for a particular font in a network document such as a webpage or style sheet. Syntax 800 may include a font definition 801 for a fallback or default font in the event a reduced font file is not needed or not available. Font definition 801 may include the font family name 803 in addition to network location information 805. The network location or address may be specified according to the following syntax: server address/serial number of the website using the font file/font file name. For example, the font file name may be FontName.eot or FontName.ttf. The network location or address (URI) of the font file specified in the website may be a virtual reference to the font file. That is, the font or font file might not be stored at the network location. Instead, the font and/or font file may be stored in various servers or locations. Thus, the server or servlet corresponding to the network location may determine the real location of the font file using a lookup table. The lookup table may be loaded into the servlet from a font server. Font definition 807, on the other hand, specifies a reduced font or a request for a dynamically reduced font file. A serial number may correspond to an identifier associated with a customer of the font service. Each web developer or website may thus be accorded a unique serial number for identification and billing purposes. The use of a serial number may further prevent font reference cross linking, i.e., another web site using the font reference from the original customer. The font definition 807 requests that same font as font definition 801, but specifies a desired glyph set, i.e., 000-5FF, 1E00-1FFF, 2000-2300. The glyph range may also be specified in a separate unicode-range field 809. Range field 908 may be optional depending on the style sheet specification. Using the above definitions 801 and 807, a user agent may request only the reduced glyph set as specified in font definition 807 if, for example, a user's bandwidth is limited or the full font file (including all glyphs) is especially large. A user may also be provided with a choice as to which font file to download by defining web browsing options or being prompted with the choice.

Figure 9A:
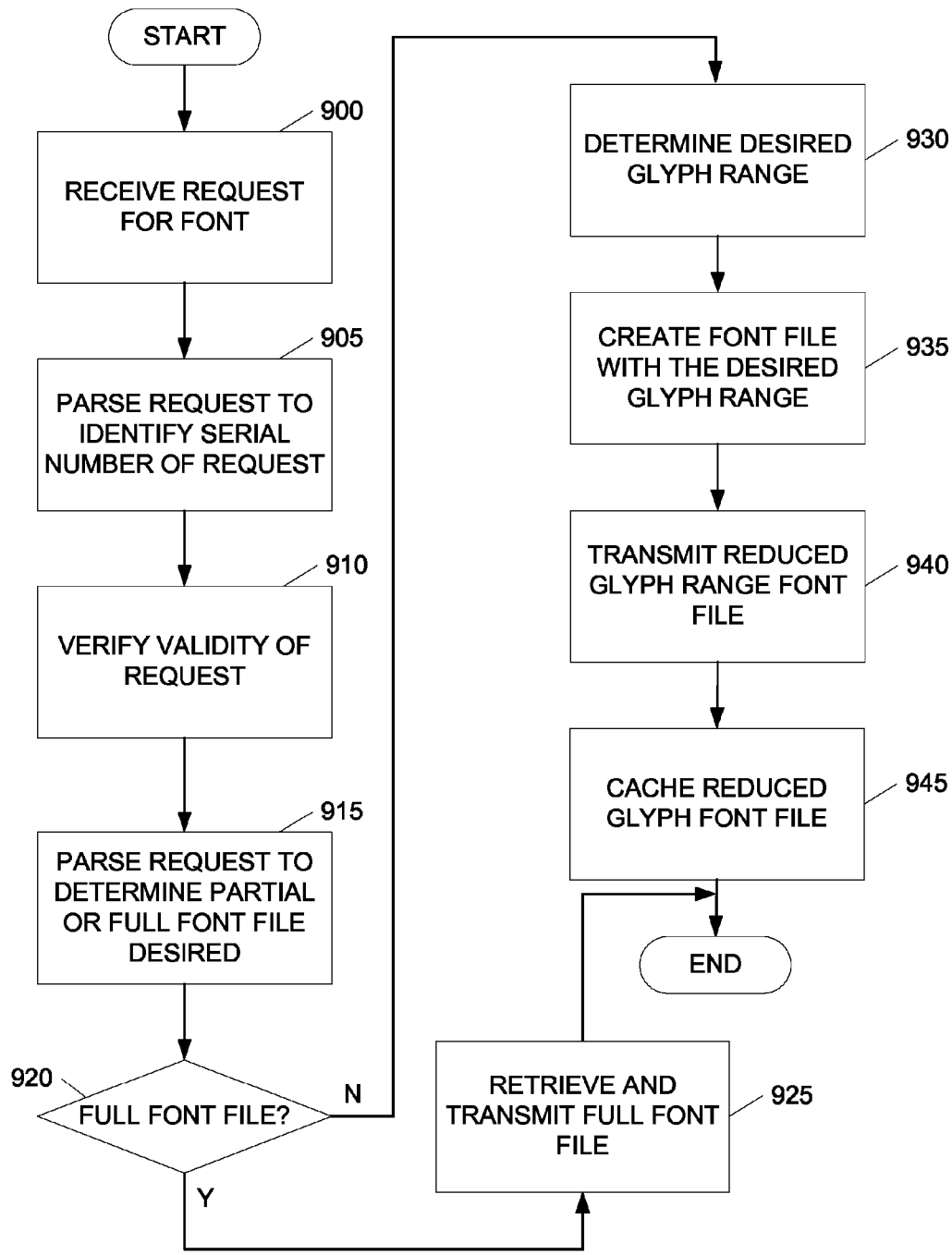
FIG. 9A illustrates an example method for processing a reduced glyph font file request and generating a reduced glyph font file according to one or more aspects described herein.

FIG. 9A illustrates an example method for dynamic glyph reduction. In step 900, a font server may receive a request for a font. The font request may correspond to an HTTP request, for example. In step 905, the server may parse the request to identify a serial number associated with the request. In step 910, the server may verify the validity of the request based on the serial number. Validation and verification of the request may include use of a web service and/or web interface that allows a customer to associate a web site with a security token (e.g., a serial number) and a group of fonts. This tuple of information may be loaded into the font server or servlet and as the HTTP request comes in, the request may be vetted against the stored tuple. For example, the serial number and website address may be compared to the serial number specified in the HTTP get request and a referrer string (e.g., HTTP_REFERER) included therewith. The font may further be compared to the group of one or more fonts stored in association with the serial number and address to determine whether or not the request is valid and if the font should be provided. If the request is valid, the font server may subsequently parse the request to determine whether a full font file is requested or a reduced glyph set font file is desired in steps 915 and 920. The determination may be made based on the parameters specified in the request. For example, if the request includes a glyph range, the server may determine whether the glyph range is less than all of the glyphs available or defined for the requested font. Alternatively or additionally, if the request does not include or specify a glyph range, the server may determine that a full glyph font file is being requested. In one or more examples, the request may be parsed by a servlet associated with a particular font server or user agent. If the full font file is requested, the full font file may be retrieved and transmitted from a font server to the requesting agent in step 925.

If, however, the server determines that the request is for a reduced glyph font file, the server may determine the desired glyph range in step 930. The glyph range may be specified in the HTTP request in one or more arrangements. As noted above, the glyph range may be defined in terms of Unicode values corresponding to the various glyphs. Once the desired range has been determined, the server may create a font file with only the desired glyph range in step 935. Such a reduced glyph font file may be created by copying the full font file and removing the glyph data for all undesired glyphs from the copy. Glyph data may include data (e.g., TrueType, Embedded OpenType or OpenType data) defining outlines for characters and symbols, bitmap information, character to glyph mapping tables and the like. Additionally or alternatively, other characteristics or aspects of a font may be removed in creating a reduced glyph font file; for example ligatures (a glyph that replaces two glyphs dynamically by a font renderer when certain glyphs are found side by side) may be removed if one of the glyphs is dynamically removed. Alternatively, the font server may create a reduced glyph font file and copy only the specified glyph data into the reduced glyph font file. In one or more arrangements, the font server may further consider the type of user agent that is being used and use a font file format that is compatible with the user agent type, as discussed herein. Once the reduced glyph font file has been created, it may be transmitted to the user agent for rendering of the associated network document (e.g., a web page) in step 940. In step 945, the reduced glyph font file may be cached in a font servlet (e.g., temporary memory storage) so that the reduced glyph font file may be served quickly to subsequent requesters. The reduced glyph font file may be stored in association with the address of the corresponding website for which the reduced glyph font file was created. Accordingly, when a subsequent request is received for a reduced glyph font file for the same website, the cached font file may be retrieved and provided to the requesting party.

Figure 9B:
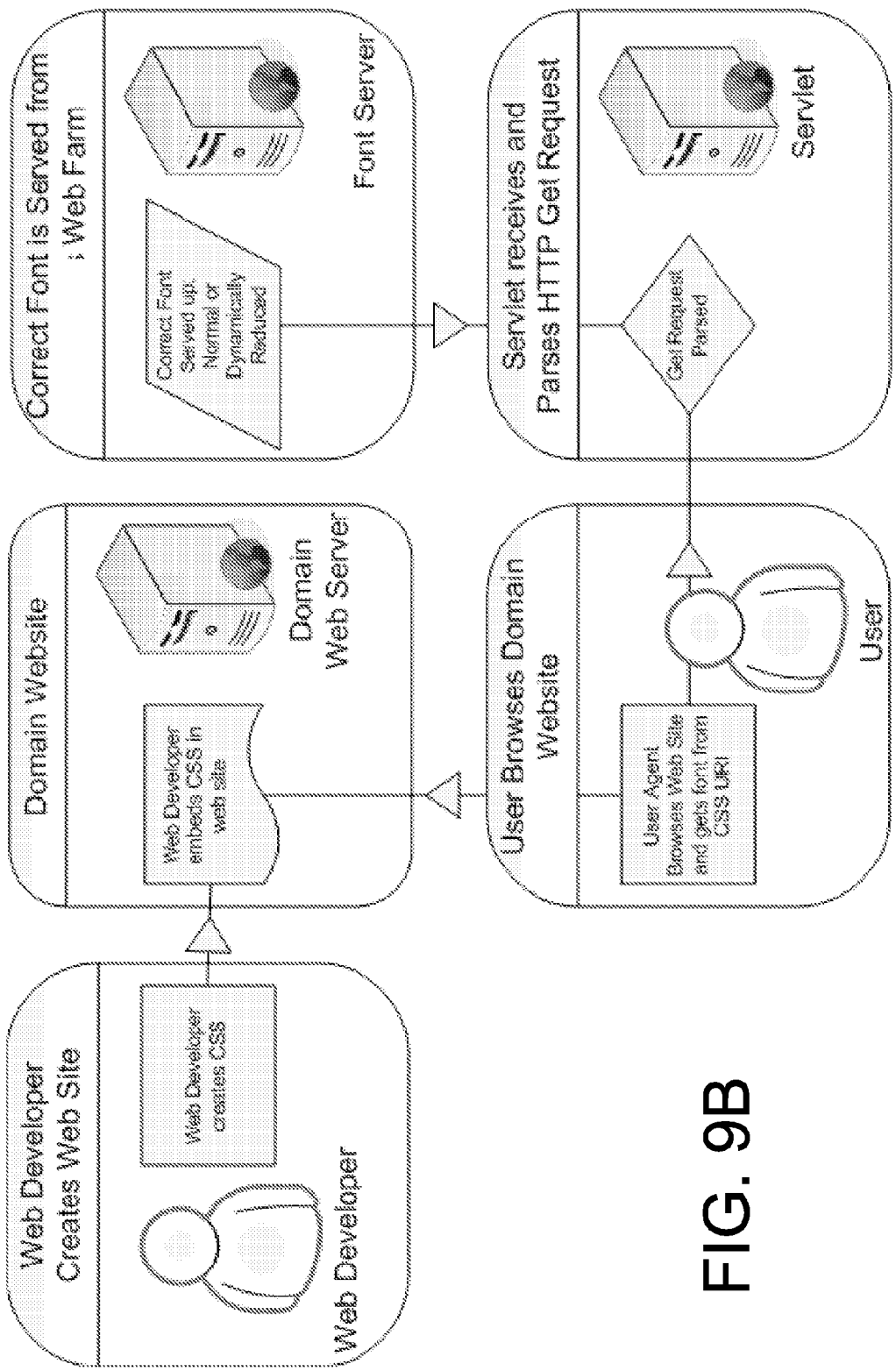
FIG. 9B illustrates an example flow diagram for obtaining a reduced glyph font file from a font server according to one or more aspects described herein.

FIG. 9B illustrates another example dynamic glyph reduction flow diagram that may be used to create a reduce glyph font file. As illustrated, a user agent may request the reduced glyph font file upon requesting and receiving a network document from a web server. Accordingly, the font server may be required to create reduced glyph font files dynamically. That is, the font server may need to create font files at the time of and responsive to specific requests. Requests may initially be received and parsed by a font servlet corresponding to the font server. Network document and/or a corresponding style sheet may be created and published by a web developer. Thus, the web developer may determine the glyph ranges that are needed to view the network document.

According to one or more aspects, references to the location of fonts in a style sheet might not be a direct reference to a particular font file. Instead, the reference may be to an identifier unique to the font or font family. Using an identifier that is unique to the font or font family but not to a particular font file (and font file format), the font server is able to choose a compatible font file format for the requesting device and user. The identifier may be assigned by the font server or by some other entity.

Figure 4:
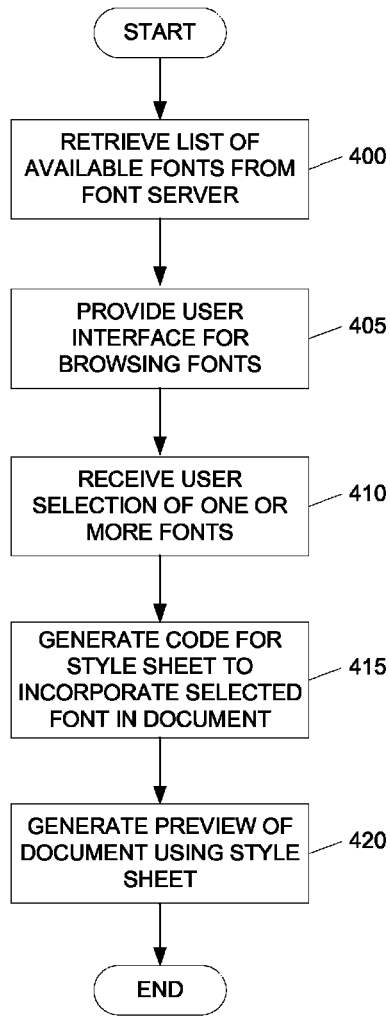
FIG. 4 is a flowchart illustrating an example method for generating a web document including a style sheet for defining a structure thereof.

FIG. 4 illustrates an example method for generating a web document including a style sheet for defining a structure thereof. In step 400, a font management application may interface with a remote font server to retrieve a list of available fonts provided by the server. In step 405, the application may provide a user interface through which a user may browse through the various fonts. In step 410, the application may receive a user selection of one of the fonts for use in a web document being created by the user. For example, the user may wish to use a font named Helvetica Bold for the body text in the web document. Alternatively or additionally, the user may specify or ask the font management application to determine the range of glyphs that are needed to view the document (e.g., if the document only includes some of the glyphs defined for the font). Thus, the application may optionally evaluate the network and the symbols and characters used therein to identify the set of glyphs incorporated in the document. In step 415, the application may generate a code segment for the style sheet to incorporate the selected font and/or glyph range into the underlying web document. The generated code segment may include a font identifier that is unique to the font or font family, but generic to all font file formats for that particular font or font family. Additionally or alternatively, the generated code segment may specify a reduced glyph range as illustrated in FIG. 8. This may reduce the amount of data the user must download to view the document. In step 420, the application may generate a preview of the web document using the corresponding style sheet. As noted herein, the style sheet may be an embedded style sheet in the web document code or may be an external style sheet. Furthermore, multiple style sheets may be referenced or used in a single network document.

Figure 5:
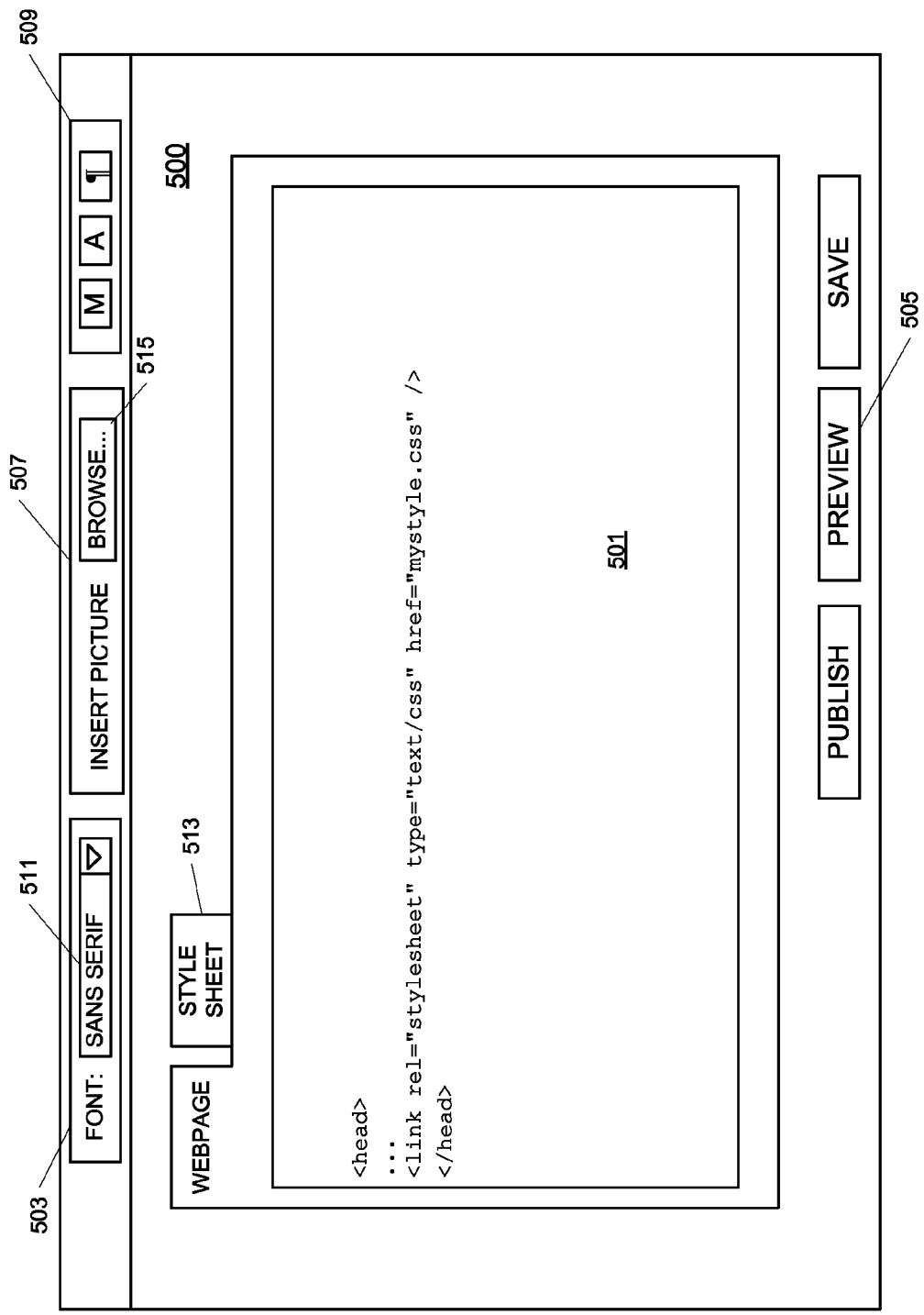
FIG. 5 illustrates an example document creation application interface according to one or more aspects described herein.

FIG. 5 illustrates an example document creation application interface 500 that includes a document input portion 501, font selection bar 503, preview option 505, image insertion panel 507 and formatting control bar 509. Document input portion 501 may provide a form in which the author may input text, images and other content to define a web page or other network document that is to be published. For example, images may be selected and inserted into document input portion 501 using image insertion panel 507. Document input portion 501 may display the document as it would appear to an end-user (i.e., with the underlying code hidden) or with the page code shown. Image insertion panel 507 may include a browse function 515509 that allows the user to find and select an image file. Image insertion panel 507 may further allow the user to define a size of the image. The document creation application may automatically generate the document code to define the size, location and other characteristics of the image in the document. Formatting control bar 509 provides controls for modifying margins, setting alignment, defining new paragraphs and the like. Font selection bar 503 may be used to select and define fonts for various portions of the document. In one example, font selection bar 503 may include a drop down menu 511 listing the available fonts. Drop down menu 511 may be populated by retrieving a font list from a remote font server in one or more configurations. As with the insertion of images and formatting codes, the document creation application may generate codes for defining the fonts selected for use in the document. In some arrangements, some codes such as font codes and color codes may be defined in an external style sheet (e.g., mystyle.css) rather than the actual network document. The network document may then include a reference to the style sheet. In interface 500, the referenced style sheet may be viewable by selecting tab 513. In an alternative embodiment, the style sheet may be embedded in the network document (i.e., the style sheet code is included as part of the network document code).

Figure 6:
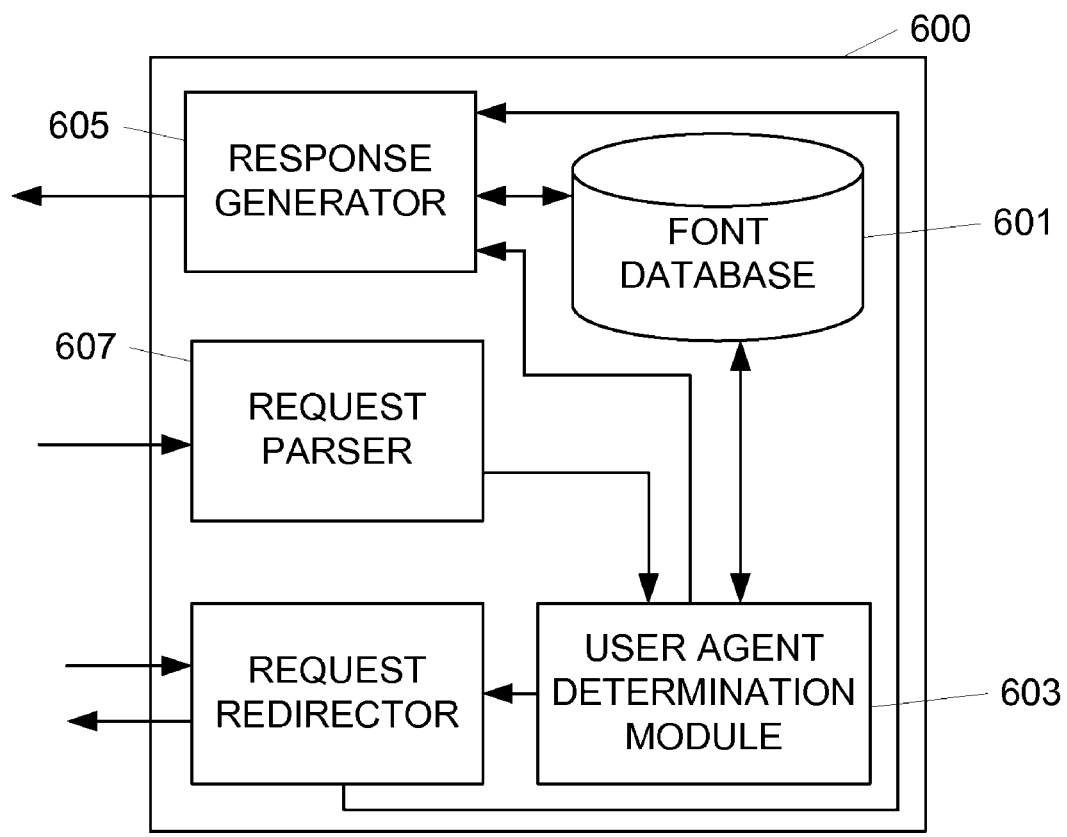
FIG. 6 illustrates an example font server that may be used to select a compatible font file.

FIG. 6 illustrates an example font server that may be used to select a compatible font file based on the browser type requesting the font. Font server 600 may include a font database 601, a user agent determination module 603, a response generator 605 and a request parser 607. Font database 601 may be configured to store font files for multiple fonts. Font database 601 may store font files for a font in multiple font file formats. Upon receiving a font request, the request parser 607 may parse and extract the header fields included in the request. For example, the request parser 607 may extract a user agent type header field from an HTTP GET request. The user agent type header information may then be passed to user agent type determination module 603 which is configured to identify the type of user agent (e.g., a type of web browser) requesting the font and font file. The request parser 607 may further be configured to analyze a referrer string (e.g., HTTP_REFERER) and combine the referrer information with the font request and serial number. This information may be collected and combined to aid in determining whether a request is valid and if the font should be served.

The user agent determination module 603 may further be responsible for determining the font file format that is compatible with the determined user agent type. In one example, the user agent determination module 603 may examine a lookup table storing an association between format types and user agent types to identify compatible formats. Once the compatible format(s) have been determined, response generator 605 may be configured to retrieve the requested font in the determined font file format from database 601. A response including the font file may then be generated and transmitted to the requesting device by response generator 605.

Optionally, font server 600 may include a request redirector 609 that is configured to redirect font requests to another server if font server 600 does not have the requested font or a compatible font file stored (e.g., in font database 601). The redirector 609 may determine the location of a compatible font file or of a requested font using a lookup table that stores available fonts and font file formats in association with their locations. The redirector 609 may further be configured to receive a font file from the other server so that response generator 605 may generate a response to the requesting device. Alternatively, the redirector 609 may simply pass on a response already generated by the other server to the requesting device, thereby acting as a transmission intermediary. If the font server 600 is configured to receive the font file from the other server, the font server 600 may also store the font file in the font database 601 so that future requests need not be redirected. The modules described may include firmware, software, hardware and/or combinations thereof. In one or more arrangements, font server 600 may further include one or more processors (not shown), memory modules such as RAM and ROM to aid in the storage and execution of processing instructions.

The modules described may include firmware, software, hardware and/or combinations thereof. In one or more arrangements, font server 600 may further include one or more processors (not shown), memory modules such as RAM and ROM to aid in the storage and execution of processing instructions.

Figure 7:
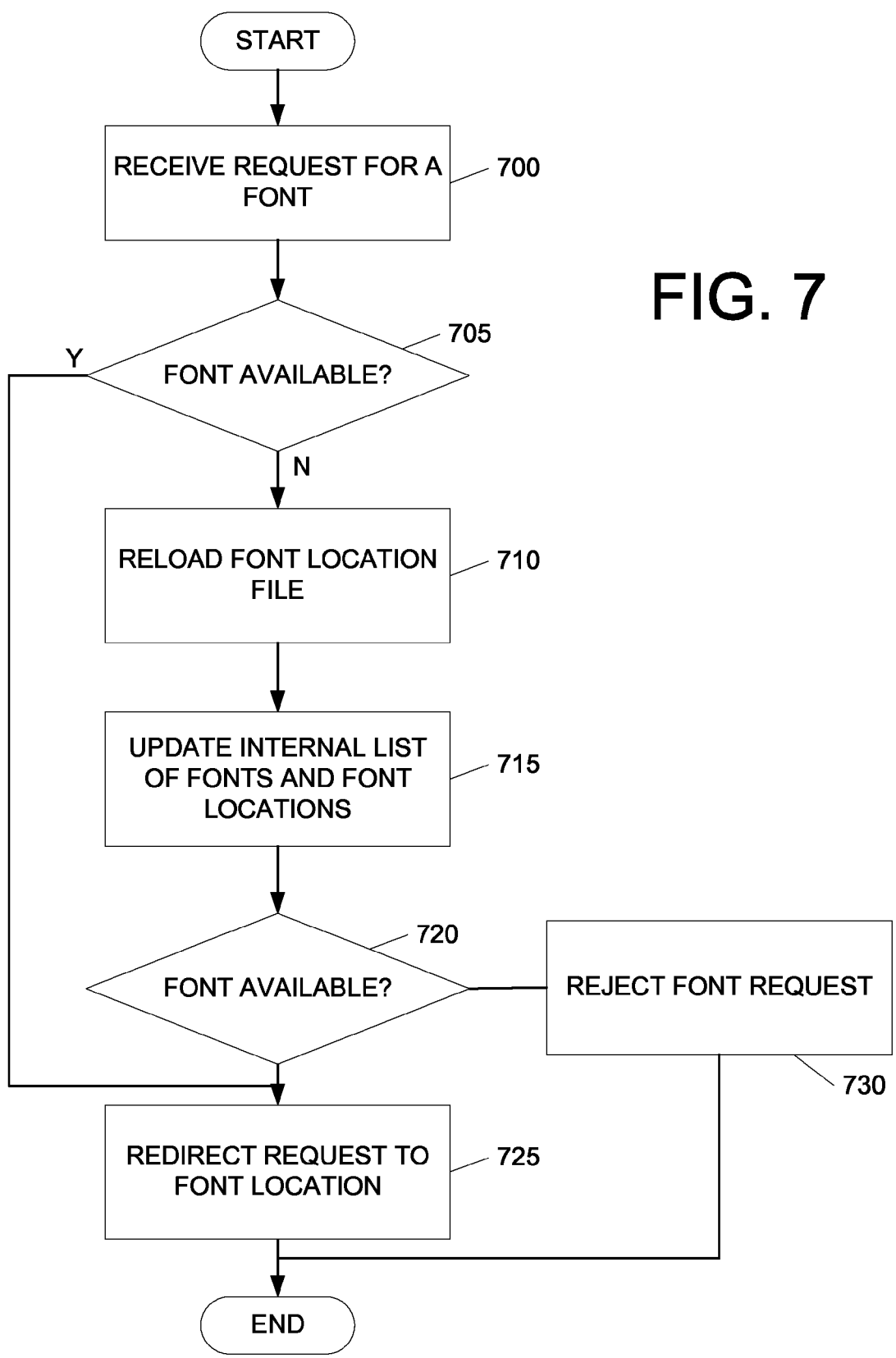
FIG. 7 is a flowchart illustrating an example method in which a font server may redirect a font file request to another server or location.

FIG. 7 illustrates a method by which a font server may process requests for fonts of which the server is not aware. In step 700, the font server or a servlet thereof may receive a font file request. The font file request may include a font identifier and a user agent type. In step 705, the font server or servlet may determine whether the requested font is available. For example, the font server or servlet may examine a lookup table for an entry corresponding to the requested font. If the server or servlet does not have information about the requested font, the servlet may reload or re-read the lookup table information from a database (e.g., in the font server) in step 710. The servlet's internal list of fonts and font locations may thus be updated using the reloaded or updated lookup table information in step 715.

Once the servlet's internal list of fonts and font locations has been updated, the servlet may make another determination as to whether the requested font is available in step 720. If so, the servlet may redirect the request to the location corresponding to the requested font in step 725. Alternatively or additionally, the servlet may retrieve the requested font from the specified location. If, however, the font is still not available, the servlet may send a font request rejection to the requesting party or agent in step 730.

The same or similar retrieval systems, methodologies and apparatuses may be used for information types other than fonts. For example, images may be stored by an image server in multiple formats to insure compatibility with a requesting user agent. Thus, when a browser attempts to retrieve an image, an image server may determine the requesting user agent type, retrieve the image in a compatible image file format and return the image to the requesting device.

The methods and features recited herein may further be implemented through any number of computer readable media that are able to store computer readable instructions. Examples of computer readable media that may be used include RAM, ROM, EEPROM, flash memory or other memory technology, CD-ROM, DVD or other optical disk storage, magnetic cassettes, magnetic tape, magnetic storage and the like.

Additionally or alternatively, in at least some embodiments, the methods and features recited herein may be implemented through one or more integrated circuits (ICs). An integrated circuit may, for example, be a microprocessor that accesses programming instructions or other data stored in a read only memory (ROM). In some such embodiments, the ROM stores programming instructions that cause the IC to perform operations according to one or more of the methods described herein. In at least some other embodiments, one or more of the methods described herein are hardwired into an IC. In other words, the IC is in such cases an application specific integrated circuit (ASIC) having gates and other logic dedicated to the calculations and other operations described herein. In still other embodiments, the IC may perform some operations based on execution of programming instructions read from ROM or RAM, with other operations hardwired into gates and other logic of IC. Further, the IC may output image data to a display buffer.

Although specific examples of carrying out various features have been described, those skilled in the art will appreciate that there are numerous variations and permutations of the above-described systems and methods that are contained within the spirit and scope of the disclosure as set forth in the appended claims. Additionally, numerous other embodiments, modifications and variations within the scope and spirit of the appended claims will occur to persons of ordinary skill in the art from a review of this disclosure.

The invention claimed is:

1. A method comprising:
receiving, at a font server, a request for a font, wherein the request indicates a type of user agent in which the font is to be displayed;
determining, by the font server, a first font file format compatible with the type of user agent from a plurality of font file formats in which font files for the requested font are provided, wherein the plurality of font file formats includes a second font file format in which the requested font is defined, wherein the type of user agent is incompatible with the second font file format;
retrieving, by the font server, a first font file in the first font file format, wherein the first font file includes data enabling a user agent to individually and separately render, in the requested font, each character in a set of characters; and
transmitting the first font file to a requesting device from the font server.

2. The method of claim 1, wherein the request comprises a uniform resource identifier and wherein the method further comprises extracting the type of user agent from the uniform resource identifier,
wherein the request for the font is received from the user agent independently of a request, by the user agent, for content using the font.

3. The method of claim 2, wherein the content is provided by a server other than the font server and wherein the request for the content is not received by the font server.

4. The method of claim 1, wherein determining whether the first font file format is compatible with the type of user agent includes determining whether the first font file format is understandable by a type of web browser.

5. The method of claim 1, wherein retrieving the first font file includes selecting the first font file from a plurality of font files corresponding to the font, wherein each of the plurality of font files includes data enabling a user agent to individually and separately render each character of the set of characters in the font and wherein each of the plurality of font files is in a different font file format.

6. The method of claim 1, wherein the request includes a font identifier unique to the font, wherein the font identifier is common to a plurality of font files corresponding to the font.

7. The method of claim 1, further comprising:
receiving a second font file in the second font file format prior to receiving the request; and generating the first font file in the first font file format using the second font file.

8. The method of claim 1, further comprising generating the first font file in response to receiving the request based on a second font file in the second font file format corresponding to the font.

9. The method of claim 1, further comprising determining whether the font is legally distributable based on information included in the request.

10. The method of claim 9, wherein the request corresponds to an HTTP GET request.

11. The method of claim 1, wherein retrieving, by the font server, a first font file in the first font file format includes:
    determining whether the first font file in the first font file format is stored in the font server; and
    in response to determining that the first font file is not stored in the font server, requesting the first font file from another font server.

12. The method of claim 11, further comprising:
    receiving the first font file from the other font server; and
    storing the first font file in the font server.

13. The method of claim 1, wherein the first font file is previously stored in the font server prior to receiving the request for the font.

14. An apparatus comprising:
    a processor; and
    memory operatively coupled to the processor and storing computer readable instructions that, when executed, cause an apparatus to:
        receive a request for a font, wherein the request indicates a type of user agent in which the font is to be used;
        determine a first font file format compatible with the type of user agent from a plurality of font file formats in which font files for the requested font are provided, wherein the plurality of font file formats includes a second font file format in which the requested font is defined, wherein the type of user agent is incompatible with the second font file format;
        retrieve a first font file in the first font file format, wherein the first font file includes data enabling a user agent to individually and separately render, in the requested font, each character in a set of characters; and
        transmit the first font file to a requesting device.

15. The apparatus of claim 14, wherein determining whether the first font file format is compatible with the type of user agent includes determining whether the first font file format is understandable by a type of web browser.

16. The apparatus of claim 14, wherein retrieving the first font file includes selecting the first font file from a plurality of font files corresponding to the font, wherein each of the plurality of font files includes data enabling the user agent to render the set of characters in the font and wherein each of the plurality of font files is in a different font file format.

17. The apparatus of claim 14, wherein the computer readable instructions, when executed, further cause the apparatus to:
    receive a second font file in the second font file format prior to receiving the request; and
    generate the first font file in the first font file format using the second font file.

18. The apparatus of claim 14, wherein the computer readable instructions, when executed, further cause the apparatus to generate the first font file in response to receiving the request based on a second font file in the second font file format corresponding to the font.

19. The apparatus of claim 14, wherein retrieving the first font file in the first font file format includes:
    determining whether the first font file in the first font file format is stored in the apparatus; and
    in response to determining that the first font file is not stored in the apparatus, requesting the first font file from a remote server.

20. One or more non-transitory computer readable media storing computer readable instructions that, when executed, cause an apparatus storing one or more fonts to:
    receive a request for a font, wherein the request indicates a type of user agent in which the font is to be used;
    determine a first font file format compatible with the type of user agent from a plurality of font file formats in which font files for the requested font are provided, wherein the plurality of font file formats includes a second font file format in which the requested font is defined, wherein the type of user agent is incompatible with the second font file format;
    retrieve a first font file in the first font file format, wherein the first font file includes data enabling a user agent to individually and separately render, in the requested font, each character in a set of characters; and
    transmit the first font file to a requesting device.

21. The one or more computer readable media of claim 20, wherein determining whether the first font file format is compatible with the type of user agent includes determining whether the first font file format is understandable by a type of web browser.

22. The one or more computer readable media of claim 20, wherein retrieving the first font file includes selecting the first font file from a plurality of font files corresponding to the font, wherein each of the plurality of font files includes data enabling the user agent to render the set of characters in the font and wherein each of the plurality of font files is in a different font file format.

23. The one or more computer readable media of claim 20, wherein the computer readable instructions, when executed, further cause the apparatus to:
    receive a second font file in the second font file format prior to receiving the request; and
    generate the first font file in the first font file format using the second font file.

24. The one or more computer readable media of claim 20, wherein the computer readable instructions, when executed, further cause the apparatus to generate the font file in response to receiving the request based on a second font file in the second font file format corresponding to the font.

25. The one or more computer readable media of claim 20, wherein retrieving the first font file in the first font file format includes:
    determining whether the first font file in the first font file format is stored in the apparatus; and
    in response to determining that the first font file is not stored in the apparatus, requesting the first font file from another apparatus configured to store fonts.

* * * * *